(12) United States Patent
Girard et al.

(10) Patent No.: US 6,976,742 B2
(45) Date of Patent: Dec. 20, 2005

(54) DRIVE SPROCKET FOR A TRACKED VEHICLE

(75) Inventors: Dominic Girard, Labaie (CA); David Belzile, Granby (CA); Eric Bertrand, St-Elie-d'Orford (CA)

(73) Assignee: Bombardier Recreational Products Inc., Verdun (CA)

(*) Notice: Subject to any disclaimer, the term of this patent is extended or adjusted under 35 U.S.C. 154(b) by 0 days.

(21) Appl. No.: 10/636,917

(22) Filed: Aug. 8, 2003

(65) Prior Publication Data

US 2004/0061378 A1 Apr. 1, 2004

Related U.S. Application Data

(60) Provisional application No. 60/402,088, filed on Aug. 9, 2002.

(51) Int. Cl.$^7$ .............................. F16H 55/30; B60S 1/62
(52) U.S. Cl. ....................................... 305/199; 305/115
(58) Field of Search .................... 305/165, 168–169, 305/178, 185, 193, 195, 199, 107, 111, 115; 180/191, 194

(56) References Cited

U.S. PATENT DOCUMENTS

| | | | | |
|---|---|---|---|---|
| 1,852,197 A | * | 4/1932 | Wilson | 305/115 |
| 3,472,563 A | * | 10/1969 | Irgens | 305/112 |
| 3,880,478 A | * | 4/1975 | Baylor | 305/115 |
| 4,095,478 A | * | 6/1978 | Rynik | 474/155 |
| 4,987,965 A | | 1/1991 | Bourret | |
| 5,161,867 A | * | 11/1992 | Johnson | 305/199 |
| 5,636,911 A | * | 6/1997 | Korpi | 305/197 |
| 5,709,440 A | | 1/1998 | Lecours | |
| 5,814,167 A | * | 9/1998 | Beaudoin | 148/639 |
| 6,000,766 A | | 12/1999 | Takeuchi et al. | |
| 6,505,895 B2 | * | 1/2003 | Courtemanche | 305/168 |
| 6,510,913 B1 | * | 1/2003 | Morin et al. | 180/182 |
| 6,698,850 B2 | * | 3/2004 | Ueno | 305/115 |
| 2003/0111904 A1 | * | 6/2003 | Cormican | 305/199 |
| 2003/0141125 A1 | | 7/2003 | Wahl | |

FOREIGN PATENT DOCUMENTS

JP 02048280 A * 2/1990 ............... 301/195

OTHER PUBLICATIONS

Ski-Doo Parts Catalog, Citation/E, Tundra/LT, 1991, copyright 1990.
Ski-Doo Parts Catalog, Alpine II, 1991, copyright 1990.
Ski-Doo Parts Catalog, Formula, 1991, copyright 1990.

* cited by examiner

*Primary Examiner*—Russell D. Stormer
*Assistant Examiner*—Jason R. Bellinger
(74) *Attorney, Agent, or Firm*—BRP Legal Services

(57) ABSTRACT

A snowmobile is propelled by an endless track that is operatively connected to the snowmobile's engine by two drive sprockets. Each drive sprocket includes one set of external teeth and two sets of internal teeth that engage three corresponding sets of track teeth formed on the track. Alignment cleats are mounted on the inside of each of one of the sets of track teeth. During low-load operation, contact between the cleats (and the track teeth on which the cleats are mounted) is minimized or eliminated, which reduces or eliminates noise caused by collisions between the metal sprocket and the metal cleats. During higher load operation, the track deforms such that the set of external sprocket teeth engage the cleats and associated set of track teeth.

36 Claims, 14 Drawing Sheets

DRIVE SPROCKET FOR A TRACKED VEHICLE

CROSS REFERENCE TO RELATED APPLICATION

This application relates to and claims priority to U.S. Provisional Application No. 60/402,088, entitled "Drive Sprocket for a Tracked Vehicle," filed on Aug. 9, 2002, the disclosure of which is specifically incorporated herein by reference.

BACKGROUND OF THE INVENTION

1. Field of the Invention

The present invention relates generally to drive sprockets for tracked vehicles, and relates more specifically to the tooth design for such drive sprockets having improved traction with reduced noise generation.

2. Description of Related Art

Tracked vehicles such as snowmobiles and snow groomers drivingly engage the ground through one or more endless tracks. Endless tracks conventionally include an outer side with a pattern of projecting lugs or ribs that are designed to engage the snow or other ground surface, apply traction, and propel the vehicle. Conventional endless tracks also include an inner side that engages one or more drive sprockets, which, in turn, are operatively connected to a propulsion system of the vehicle.

The drive sprockets and the inner side of the endless track typically include mating teeth that provide traction between the drive sprockets and the endless track. Conventional drive sprockets use either external or internal teeth.

FIGS. 9 and 10 illustrate a drive sprocket 1010 that includes a plurality of radially-extending sprocket teeth 1020 projecting outwardly from an outer circumferential side of the sprocket 1010. An endless track 1030 includes a plurality of longitudinally spaced holes that define a plurality of track teeth 1040. Reinforcing metal bars (not shown) extend laterally across the endless track 1030 through the track teeth 1040 to reinforce the track teeth 1040 and the track 1030. The track teeth 1040 mesh with the sprocket teeth 1020 to provide traction between the drive sprocket(s) 1010 and the track(s) 1030. In the typical example where the drive sprocket 1010 is used, two such sprockets 1010 usually are provided to engage each endless track 1030.

Each track tooth 1040 is surrounded by a metal alignment cleat 1050 that meshes with the sprocket 1010 to keep the endless track 1030 laterally aligned with the drive sprockets 1010. As the drive sprockets 1010 rotate to propel the vehicle, the cleats 1050 rattle against the valleys formed between adjacent sprocket teeth 1020. This metal-to-metal contact creates noise, especially when the vehicle travels quickly.

FIGS. 11–13 illustrate an additional conventional drive sprocket 1060 that includes a plurality of axially-extending sprocket teeth 1070. An endless track 1080 includes a plurality of longitudinally-spaced track teeth 1090 projecting inwardly from an inner side of the endless track 1080. The sprocket teeth 1070 engage the track teeth 1090 to provide traction between the sprocket 1060 and the endless track 1080. Alignment cleats 1050 are laterally offset from the track teeth 1090 on the endless track 1080 and the sprocket teeth 1070. Consequently, the cleats 1050 do not typically rattle against the sprockets 1060 as much as in the previous example, and noise is reduced as compared to sprockets 1010 that rely on radially-extending teeth 1020.

While the use of axially-extending teeth 1070 instead of radially-extending teeth 1020 reduces noise, the axially-extending teeth 1070 are not as effective at generating traction with the track 1080 as the radially-extending teeth 1020. The reduction in traction may be caused, in part, by the fact that the internal track teeth 1090 are typically not reinforced and therefore deform under high loads. Accordingly, a greater number of sprockets 1060 must be used to generate sufficient traction with the endless track 1080. As illustrated in FIGS. 8 and 9, four internally toothed sprockets 1060 (two inner sprockets 1060 with two sets of sprocket teeth 1070 and two outer sprockets 1060 with one set of sprocket teeth 1070) are typically used.

As a result of this, a need has developed for a sprocket construction that provides the superior traction of the drive sprocket 1010 while also minimizing the generation of noise as does the drive sprocket 1030.

Others have attempted to solve these problems. FIGS. 14–16 illustrate an additional conventional drive sprocket 1110 that includes a plurality of axially-extending sprocket teeth 1120. The sprocket teeth 1120 engage the track teeth 1090 of the endless track 1080, as shown, for example, in FIGS. 12 and 13. The drive sprocket 1110 further includes a plurality of radially-extending sprocket teeth 1130 projecting outwardly from the an outer circumferential side of the sprocket 1110. The radially-extending sprocket teeth 1130 mesh with track teeth 1040, as shown, for example in FIGS. 9 and 10 to provide traction between the drive sprocket 1110 and the endless track. The radially-extending sprocket teeth 1130 extend directly from the outer circumference of the sprocket 1110 and have a width substantially the same as the sprocket teeth 1120. The drive sprocket 1110 exhibits many of the drawbacks identified above.

SUMMARY OF THE INVENTION

Accordingly, one aspect of embodiments of the present invention provides a drive sprocket that generates more traction than conventional drive sprockets.

An additional aspect of embodiments of the present invention provides an improved drive sprocket that reduces noise.

A further aspect of embodiments of the present invention provides an improved drive sprocket that includes at least two sets of teeth.

A further aspect of embodiments of the present invention provides a drive sprocket with both radially-extending and axially-extending teeth.

A further aspect of embodiments of the present invention provides a sprocket for a vehicle having an endless track and a power plant. The sprocket includes a sprocket wheel that is engagable with the power plant of the vehicle. The sprocket wheel has a rotational axis, a perimetrical surface, and first and second axial surfaces. The sprocket also includes a first plurality of teeth extending radially outwardly from the perimetrical surface in spaced-apart relation, and at least a second plurality of teeth extending axially outwardly from the first axial surface in spaced-apart relation. A third plurality of teeth can extend axially outwardly from the second axial surface in spaced-apart relation.

The sprocket wheel, the first plurality of teeth, and the second plurality of teeth may be integrally formed. The sprocket may also include a third plurality of teeth extending axially outwardly from the second axial surface in spaced-apart relation. Each of the first plurality of teeth, each of the second plurality of teeth, and each of the third plurality of teeth may be radially aligned.

The perimetrical surface defines valleys between adjacent ones of the first plurality of teeth. The perimetrical surface may be generally cylindrically shaped such that each valley comprises an arc-shaped surface.

Each of the second plurality of teeth define an outward surface that may be disposed radially farther from the rotational axis than adjacent valleys.

Each of the second plurality of teeth may have two notches therein. Each of the second plurality of teeth has a base portion and a tip portion. The notches may be formed in the base portion.

In a circumferential direction, each of the second plurality of teeth may be wider than each of the first plurality of teeth.

Embodiments of the present invention are also directed toward a vehicle that includes a frame, a power plant supported by the frame, and a sprocket operatively connected to the power plant. The sprocket is one of the previously described sprockets.

The endless track may include a belt having an outer side and an inner side. The belt has a plurality of holes therethrough. The portions of the belt between the holes define a first plurality of track teeth. The endless track also includes a plurality of lugs projecting from the outer side, and a second plurality of track teeth projecting from the inner side. The second plurality of track teeth engage the second plurality of sprocket teeth.

Each of the first plurality of track teeth may longitudinally register with each of the second plurality of track teeth, and each of the first plurality of sprocket teeth may be radially aligned with each of the second plurality of sprocket teeth.

The endless track may further include a third plurality of track teeth projecting from the inner side. The third plurality of track teeth engages the third plurality of sprocket teeth. Each of the second and third pluralities of track teeth may be disposed laterally adjacent to each of the first plurality of teeth, on opposite sides thereof. Each of the first plurality of sprocket teeth, each of the second plurality of sprocket teeth, and each of third plurality of sprocket teeth may be radially aligned.

When the endless track does not deform, the first plurality of track teeth preferably do not engage the perimetrical surface. Similarly, when the endless track does not deform, the first plurality of track teeth preferably do not engage the first plurality of sprocket teeth. The second plurality of track teeth may include a flexible, resilient material. When the second plurality of track teeth deform under a load exerted thereon by the second plurality of sprocket teeth, the first plurality of sprocket teeth may engage the first plurality of track teeth to supplement traction between the sprocket and the endless track.

The endless track may further include a plurality of cleats. Each cleat includes a base portion secured to one of the first plurality of track teeth and at least one cleat portion projecting from the base portion away from the inner side. When the second plurality of teeth do not deform, the base portions of the cleats do not contact the perimetrical surface. When the second plurality of track teeth deform under a load exerted thereon by the second plurality of sprocket teeth, the first plurality of sprocket teeth engage the cleats to enhance traction between the sprocket and the endless track.

The perimetrical surface may define a sprocket valley between adjacent teeth of the first plurality of sprocket teeth. The inner side of the belt may define a track valley between adjacent teeth of the second plurality of track teeth. Each of the second plurality of sprocket teeth defines an outward surface, and the outward surfaces of the second plurality of sprocket teeth engage the track valleys as the sprocket rotates such that when the endless track does not deform, the first plurality of track teeth do not contact the sprocket valleys.

The endless track may further include a plurality of alignment cleats. When the endless track does not deform, the base portions of the cleats preferably do not contact the sprocket valleys.

The endless track may be a resilient, flexible material. The first and second pluralities of track and sprocket teeth may be sized and spaced such that the first plurality of sprocket teeth drivingly engage the first plurality of track teeth only when a portion of the endless track deforms longitudinally as the second plurality of sprocket teeth apply a load thereto.

When the endless track is laterally aligned with the sprocket, the cleat portions of the cleats preferably do not touch the sprocket as the sprocket rotates. As the sprocket rotates, the cleat portions preferably extend into the notches of adjacent ones of the second plurality of sprocket teeth.

The first plurality of track teeth may engage the first plurality of sprocket teeth as the sprocket rotates.

Embodiments of the present invention are also directed toward a sprocket for a vehicle having an endless track and a power plant. The sprocket includes a sprocket wheel engagable with the power plant of the vehicle. The sprocket wheel has a rotational axis. The sprocket also includes at least first and second pluralities of sprocket teeth projecting outwardly from the sprocket wheel.

Embodiments of the present invention are also directed toward a vehicle that includes a frame, a power plant supported by the frame, and at least one sprocket operatively connected to the power plant. Each of the at least one sprockets includes a sprocket wheel rotationally supported by the frame and operatively connected to the power plant. Each sprocket also includes first and second laterally adjacent pluralities of sprocket teeth projecting outwardly from the sprocket wheel. The vehicle further includes an endless track supported by the frame. The endless track passes around the at least one sprocket and has first, second, and third pluralities of laterally adjacent track teeth that engage the first, second, and third pluralities of sprocket teeth, respectively. The at least one sprocket may consist of two sprockets. A portion of the track may be longitudinally, resiliently deformable and the first plurality of sprocket teeth may only engage the third plurality of track teeth when the track longitudinally deforms Additional and/or alternative objects, features, aspects, and advantages of the present invention will become apparent from the following description, the accompanying drawings, and the appended claims.

BRIEF DESCRIPTION OF THE DRAWINGS

For a better understanding of the present invention as well as other objects and further features thereof, reference is made to the following description which is to be used in conjunction with the accompanying drawings, where.

DETAILED DESCRIPTION OF PREFERRED EMBODIMENTS OF THE INVENTION

Figure 1:
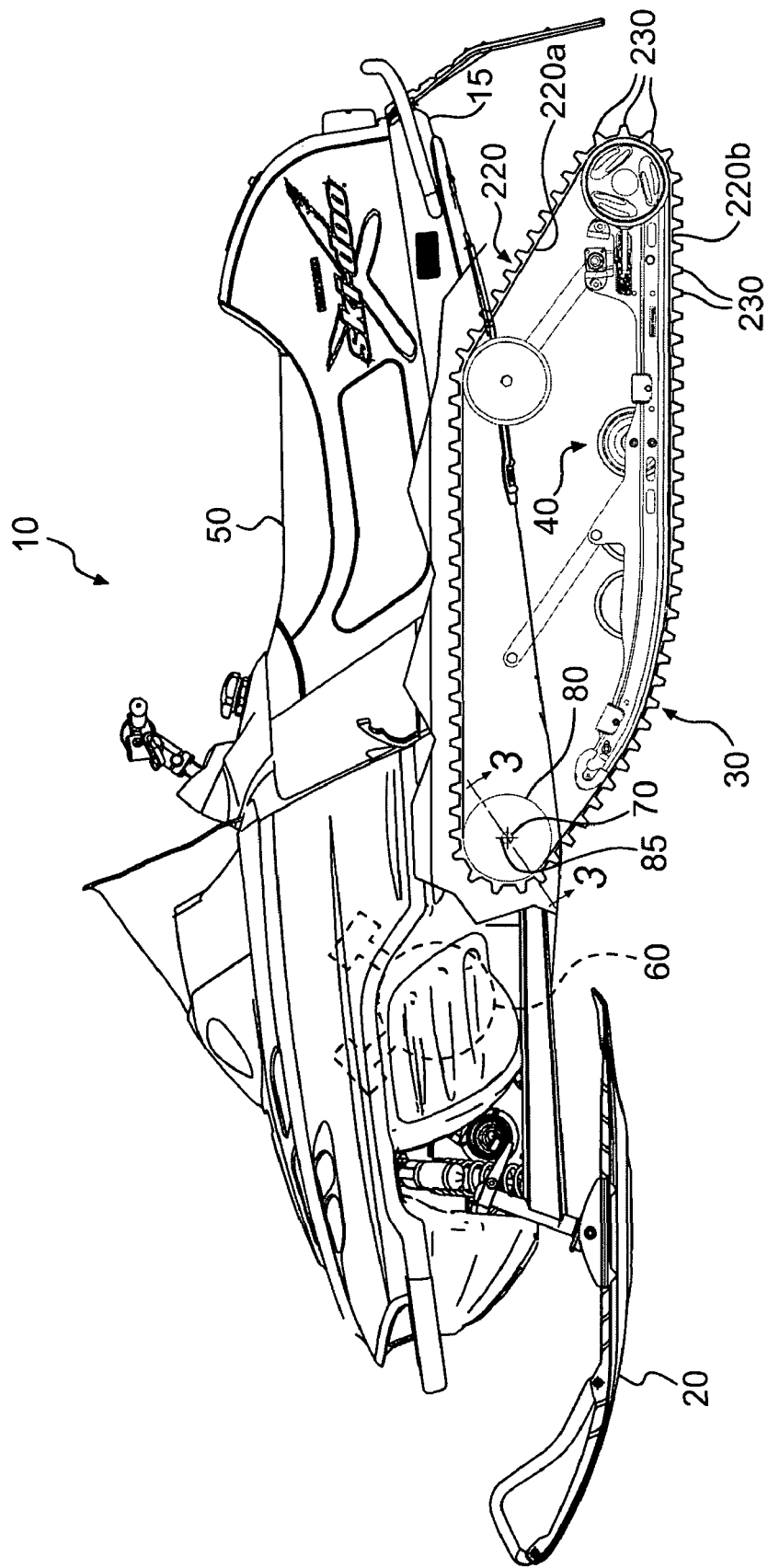
FIG. 1 is a side view of a snowmobile according to an embodiment of the present invention.

As illustrated in FIG. 1, a snowmobile 10 according to an embodiment of the present invention includes a frame 15 that supports a pair of selectively steerable skis 20. An endless track 30 is supported by the frame 15 through a slide rail suspension system 40. The frame 15 also supports a straddle-type seat 50.

The snowmobile 10 includes a propulsion unit 60 (shown in phantom), such as an internal combustion engine, that is operatively connected to the endless track 30 via a drive axle 70. A continuously variable transmission (not shown) connects the propulsion unit 60 to the drive axle 70. Two drive sprockets 80, as shown in FIG. 3 are mounted to the drive axle 70 for common rotational movement about a drive sprocket axis 85. As illustrated in FIGS. 2–6, each sprocket 80 includes three sets of sprocket teeth 90, 100, 110 that engage three corresponding sets of track teeth 120, 130, 140 in the endless track 30 to provide traction between the sprockets 80 and the endless track 30.

The drive sprocket 80 comprises a generally disc-shaped sprocket wheel 150 that has an outer perimetrical surface 160 and two opposing axial surfaces 170, 180. The sprocket wheel 150 has a central bore 190 through which the drive axle 70 extends. The bore 190 and the drive axle 70 have mating hexagonal cross-sections that rotationally secure the sprocket 80 to the drive axle 70. Alternative methods of rotationally securing the sprocket 80 to the drive axle 70 may also be used (e.g., a key and keyway, square cross-sections, radial pins, etc.).

The sprocket teeth 100 comprise circumferentially-spaced teeth that project radially outwardly from the perimetrical surface 160. The sprocket teeth 90, 110 comprise circumferentially-spaced teeth that project axially outwardly from the axial surfaces 170, 180, respectively. Because the sprocket teeth 110 are mirror images of the sprocket teeth 90, only the sprocket teeth 90 will be discussed in detail below. It is to be understood that the description of the sprocket teeth 90 applies equally to the sprocket teeth 110.

The sprocket wheel 150 and the sprocket teeth 90, 100, 110 are integrally formed, for example by integral metal casting. To reduce the weight of the snowmobile 10, the sprocket 80 preferably comprises a strong, light material such as aluminum or plastic. Also, while the sprocket 80 is preferably made of plastic, it is contemplated that the sprocket 80 may be made of any other material including steel or a composite material including aluminum. In addition, the sprocket 80 could be made from a composite including carbon fibers. In other words, the exact composition of the sprocket 80 may be selected from a wide variety of substances without departing from the scope of the present invention. In addition, the sprocket teeth 90, 100, 110 may be formed separately from the sprocket wheel 150 and subsequently rigidly fastened (via glue, rivets, welds, bolts, etc.) to the sprocket wheel 150.

Figure 4:
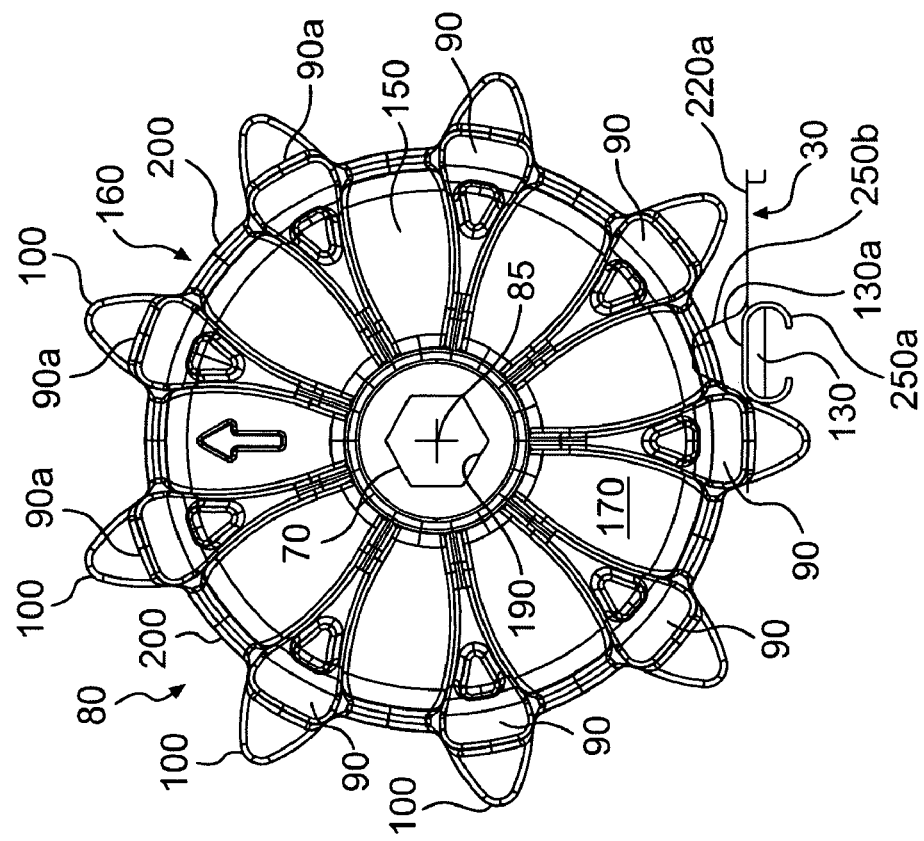
FIGS. 4 and 5 are side views of the drive sprocket and track of the snowmobile illustrated in FIG. 1.
Figure 5:
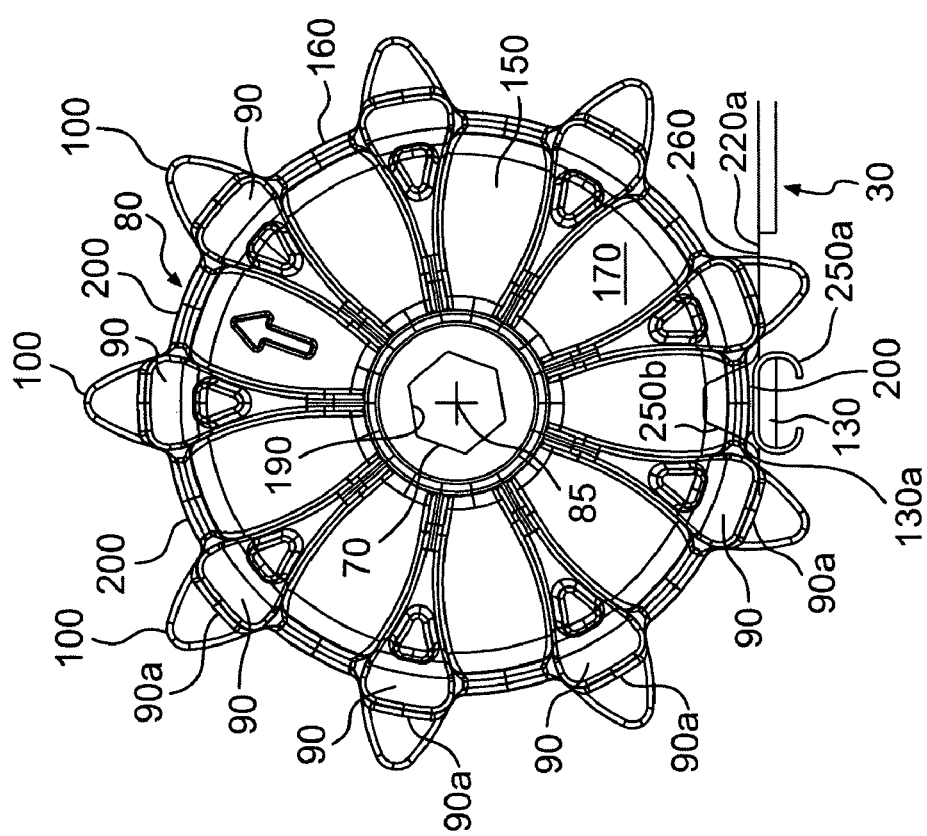

As illustrated in FIGS. 4 and 5, the sprocket teeth 90, 100, 110 are preferably radially aligned such that each sprocket tooth 90 is disposed at the same circumferential position as a corresponding one of each of the sets of sprocket teeth 100, 110. However, the sets of sprocket teeth 90, 100, 110 may alternatively be out of phase with each other without departing from the scope of the present invention.

Figure 2:
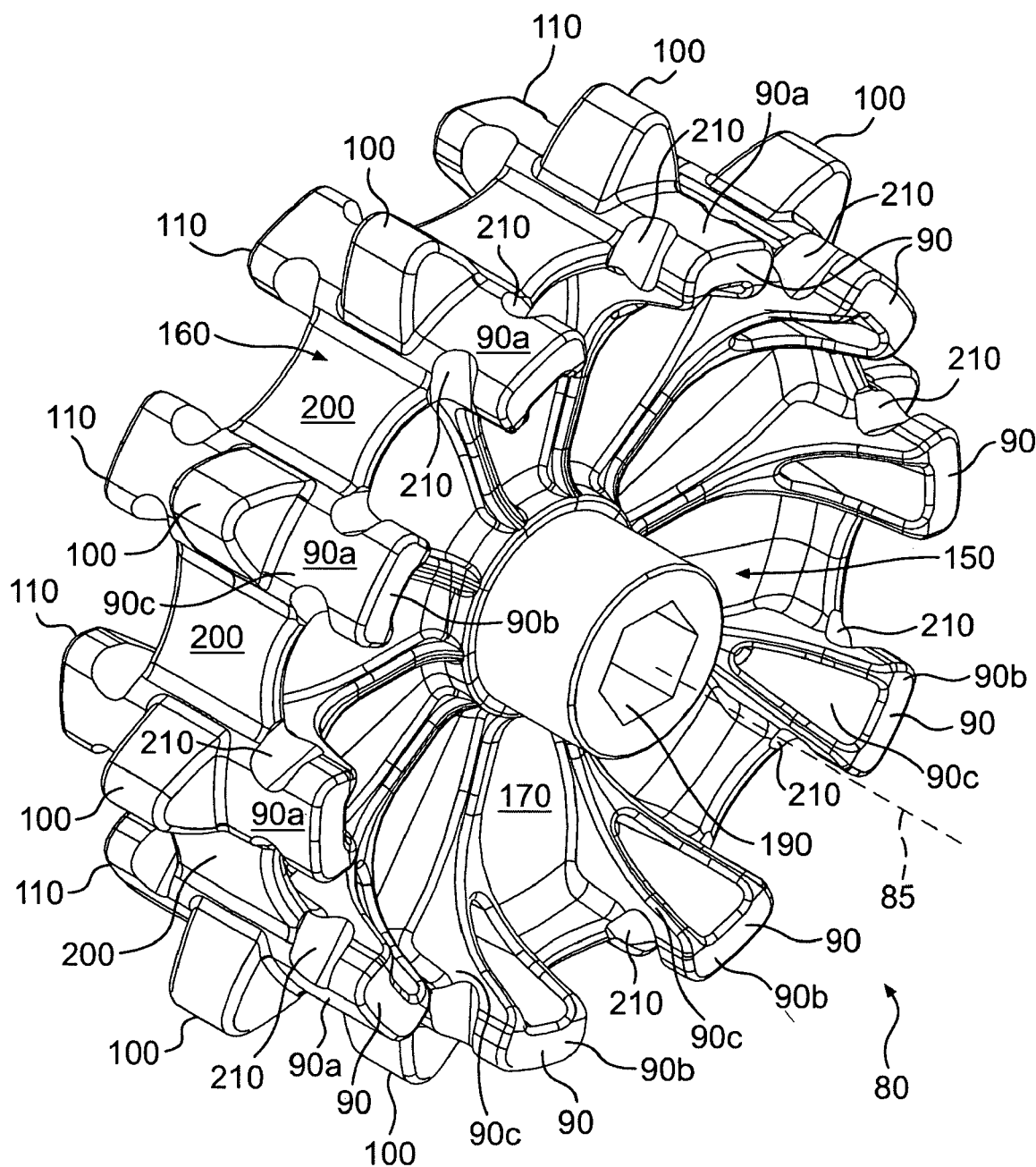
FIG. 2 is a perspective view of a drive sprocket of the snowmobile illustrated in FIG. 1.
Figure 3:
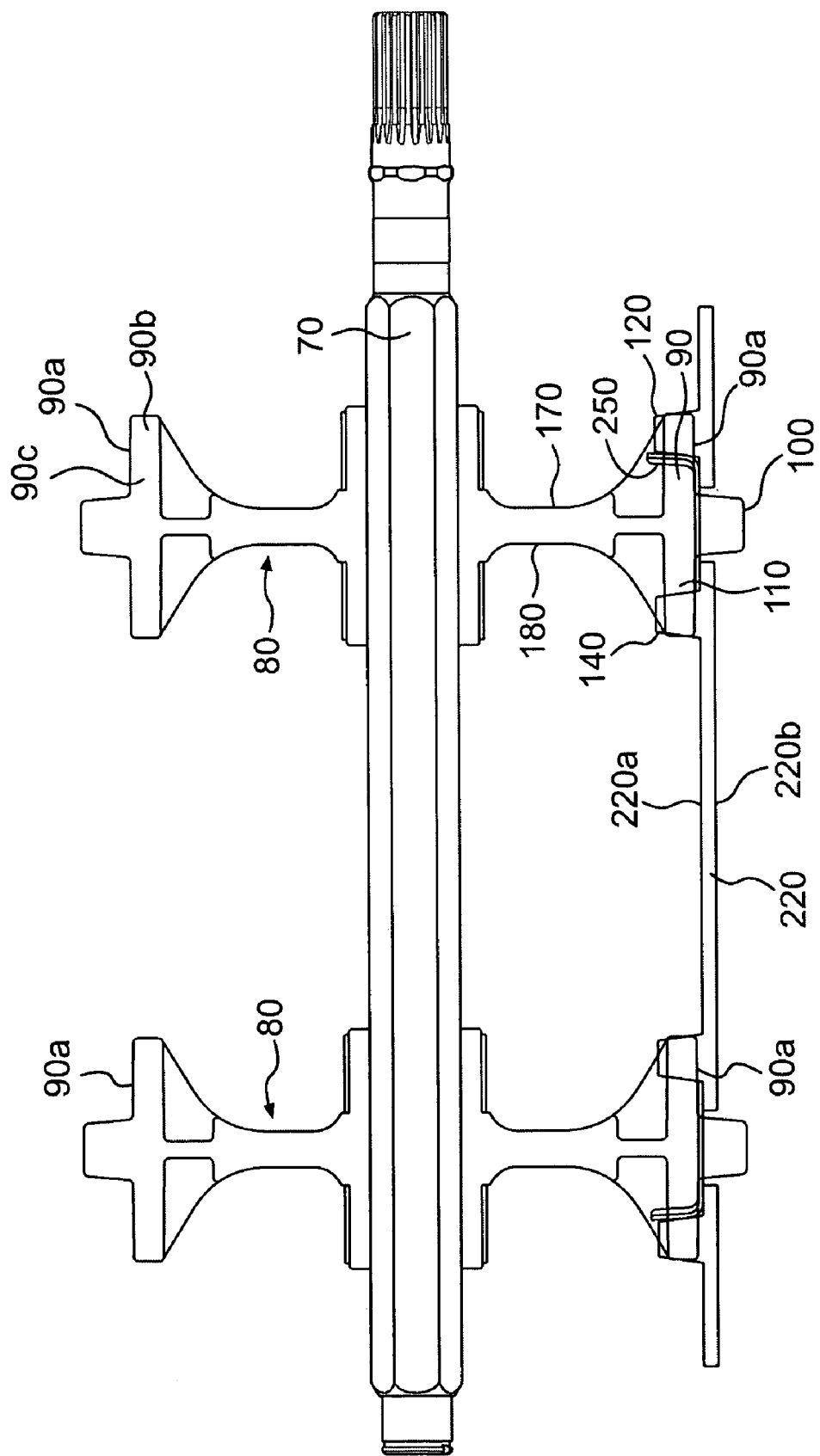
FIG. 3 is a front cross-sectional view of the drive axle and drive sprockets, taken along the line 3—3 in FIG. 1.

As illustrated in FIGS. 2, 4 and 5, the perimetrical surface 160 defines sprocket valleys 200 between adjacent sprocket teeth 100. The perimetrical surface 160 is generally cylindrically shaped such that the sprocket valleys 200 each have an arc-shaped surface. Each of the sprocket teeth 90 have radially outward surfaces 90a that extend radially outwardly farther from the rotational axis 85 than the adjacent sprocket valleys 200.

Each sprocket tooth 90 includes a base portion 90c connecting the sprocket wheel 150 to the tip portion 90b. Notches 210 are formed on opposite circumferential sides of the base portion 90c of each sprocket tooth 90. The notches 210 delimit the transition point between the base portion 90c and the tip portion 90b.

Figure 6:
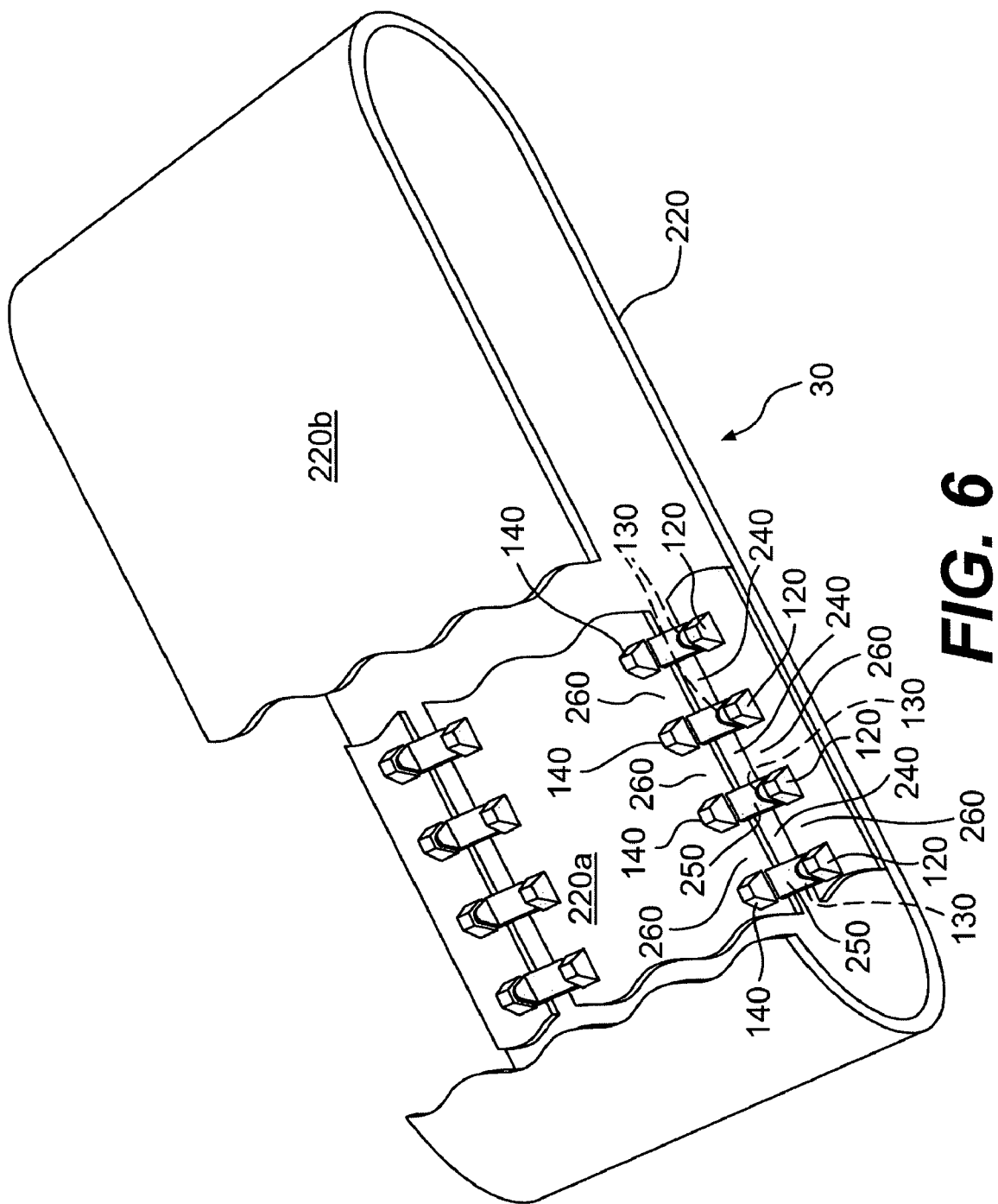
FIG. 6 is a partial perspective view of the track of the snowmobile illustrated in FIG. 1.

As illustrated in FIGS. 1 and 6, the endless track 30 comprises an endless flexible belt 220 with an inner side 220a and an outer side 220b. The endless track 30 includes a plurality of lugs (or ribs) 230 that project from the outer side 220b to give the endless track 30 traction against the snow as the endless track 30 propels the snowmobile 10.

As illustrated in FIG. 6, the track teeth 130 are defined by a plurality of longitudinally spaced holes 240 through the endless belt 220. As illustrated in FIGS. 4 and 5, inner surfaces 130a of the track teeth 130 are defined by the inner side 220a of the belt 220.

The endless track 30 also comprises a plurality of alignment cleats 250 that are mounted onto the track teeth 130. As illustrated in FIGS. 4 and 5, each cleat 250 includes a base portion 250a and a cleat portion 250b. The base portion 250a has a generally C-shaped cross-section that wraps around the inner surface 130a of one of the track teeth 130. The cleat portion 250b projects inwardly away from the inner side 220a of the belt 220. The alignment cleats 250 preferably comprise a strong, light, stamped sheet of metal such as steel. As would be appreciated by those skilled in the art, however, any other suitable material (e.g., aluminum, etc.) may be used. Moreover, the cleats 250 need not be stamped from a metal sheet but may be cast or molded into the appropriate configuration.

Two sets of the track teeth 120, 140 project inwardly from the inner side 220a of the endless belt 220. The track teeth 120 are longitudinally spaced from each other around the inner side 220a. The track teeth 140 are also longitudinally spaced from each other around the inner side 220a. Track valleys 260 are defined by the inner side 220a of the endless belt 220 between longitudinally adjacent pairs of the track teeth 120, 140. The track teeth 120, 140 are positioned laterally adjacent to the track teeth 130 but are disposed on opposite lateral sides of the track teeth 130. Each of the track teeth 130 longitudinally registers with one tooth from each of the sets of track teeth 120, 140 (i.e., teeth from each set of track teeth 120, 130, 140 are longitudinally aligned) in the preferred example. Of course, if desired, the track teeth 120, 130, 140 need not be longitudinally aligned. Offset track teeth 120, 130, 140 are also considered to fall within the scope of the present invention.

The endless track 30 comprises a strong, flexible material such as rubber reinforced with fabric and metal. The endless belt 220 and track teeth 120, 130, 140 are integrally formed with each other. Alternatively, any one or more of the track teeth 120, 130, 140 may be formed separately from the remaining components of the endless track 30 and subsequently attached to the endless track 30 (via glue, bolts, rivets, etc.).

While only one lateral side of the endless track 30 has been described in detail, it is to be understood that, as is shown in FIGS. 3 and 6, additional, laterally-offset sets of track teeth mirror the track teeth 120, 130, 140. The additional track teeth engage the second sprocket 60.

Hereinafter, the engagement between the sprocket 80 and the endless track 30 is described with specific reference to FIGS. 4 and 5. The sprockets 380 and 480 described below engage the endless track 30 in a similar manner.

During low-load operation of the snowmobile 10 (e.g., during low acceleration, constant low speed use, coasting, etc.), successive sprocket teeth 90, 110 engage successive track teeth 120, 140, respectively. During this low-load engagement, the traction provided between the sprocket teeth 90, 110 on the two laterally spaced sprockets 80 and track teeth 120, 140 is sufficient to prevent the endless track 30 from slipping relative to the sprockets 80.

The sprocket 80 and track 30 reduce noise by reducing or eliminating rattling contact between the alignment cleats 250 and the sprocket 80. As the sprocket 80 rotates, the outer surfaces 90*a* of the sprocket teeth 90 register with and contact the track valleys 260. Similarly, the inner surfaces 130*a* of the track teeth 130 and their surrounding cleat bases 250*a* register with the sprocket valleys 200. However, because the sprocket valleys 200 are disposed radially inwardly on the sprocket 80 relative to the outer surfaces 90*a* and because the cleat base portions 250*a* are disposed at generally the same level (in a direction perpendicular to the inner side 220*a* of the endless track 220) as the track valleys 260, the cleat base portions 250*a* remain slightly spaced from the sprocket valleys 200. Consequently, the metal cleats 250 do not rattle against the sprocket 80 to generate noise.

In the illustrated embodiment, while sprocket tooth and valley height differences are used to prevent the cleats 250 from rattling against the sprockets 80, various other dimensions may alternatively be altered to achieve the same result without departing from the scope of the present invention. For example, the track valleys 260 could be built up slightly to space the cleats farther away from the sprocket valleys. Alternatively, the cleats could be disposed in depressions formed on the inner side 220*a* of the endless belt 220 to create a height gap between the cleats 250 and the track valleys 260.

As the sprocket 80 rotates, the cleat portions 250*b* of the cleats 250 extend into the notches 210 formed in adjacent ones of the sprocket teeth 120. If the cleat portions 250*b* are longitudinally narrow enough, the cleat portions 250*b* may simply extend into an open area formed between the notches 210 of adjacent sprocket teeth 120. Because the circumferential width of the space formed between adjacent notches 210 is larger than the longitudinal width of the cleat portions 250*b*, the cleat portions 250*b* do not typically contact the sprocket teeth 90, even when the track teeth 120, 140 deform slightly in its longitudinal direction. However, if the endless track 30 and sprocket 80 begin to misalign, the cleat portions 250*b* contact the sprocket 80 to urge the track 30 back into alignment with the sprocket 80. Accordingly, unless the cleats 250 are realigning the endless track 30 and sprocket 80, cleat-to-sprocket rattling is reduced or eliminated altogether.

During low-load operation, the endless track 30 does not significantly longitudinally deform and the track and sprocket teeth 90, 110, 120, 140 provide sufficient traction between the sprockets 80 and the endless track 30. Accordingly, the sprocket 80 and track 30 are designed so that the sprocket teeth 100 (and the cleat base portions 250*a* that surround the sprocket teeth 100) do not contact or engage the track teeth 130. In a circumferential direction of the sprocket 80, the sprocket teeth 100 are slightly narrower than the sprocket teeth 90, 110. However, the engaging faces of the track teeth 120, 130, 140 are longitudinally aligned. Consequently, when the sprocket teeth 90, 110 engage the track teeth 120, 140, a slight circumferential gap is formed between the mating faces of the sprocket teeth 100 and the track teeth 130 (and the cleat base portions 250*a*). The cleat base portions 250*a* do not, therefore, contact or rattle against the sprocket teeth 100.

As the load exerted on the endless track 30 by the sprocket 80 increases, the sprocket and track teeth 90, 110, 120, 140 become less capable of handling the increased tractional load between the sprocket 80 and the endless track 30. Simultaneously, the endless track 30 deforms longitudinally. The longitudinal deformation of the endless track 30 closes the gap between the cleat base portions 250*a* (and the track teeth 130) and the sprocket teeth 100. The sprocket teeth 100, therefore, engage the cleat base portions 250*a* and track teeth 130 to provide additional sprocket-to-track traction.

While engagement between the sprocket teeth 100 and the track teeth 130 causes the sprocket 80 to rattle against the cleat base portions 250*a*, the high-load situations when the additional traction is required typically occur when the snowmobile 10 is traveling slowly but accelerating quickly. The slower rotational speed of the sprocket 80 in this situation minimizes the increased noise caused by cleat 250 rattling.

While in the illustrated embodiment, the sprocket teeth 100 selectively engage the track teeth 130 during high loads by reducing the circumferential length of each sprocket tooth 100, the same effect may be obtained by modifying various other components of the endless track 30 and/or sprocket 80. For example, instead of circumferentially narrowing the sprocket teeth 100, the holes 240 in the endless track 30 could be longitudinally widened slightly. Alternatively, the sprocket teeth 100 could be circumferentially shifted slightly relative to the sprocket teeth 90, 110 or the track teeth 130 could be longitudinally shifted slightly relative to the track teeth 120, 140. Consequently, the sprocket teeth 100 would be slightly out of phase (in a trailing direction) with the track teeth 130.

Figure 10:
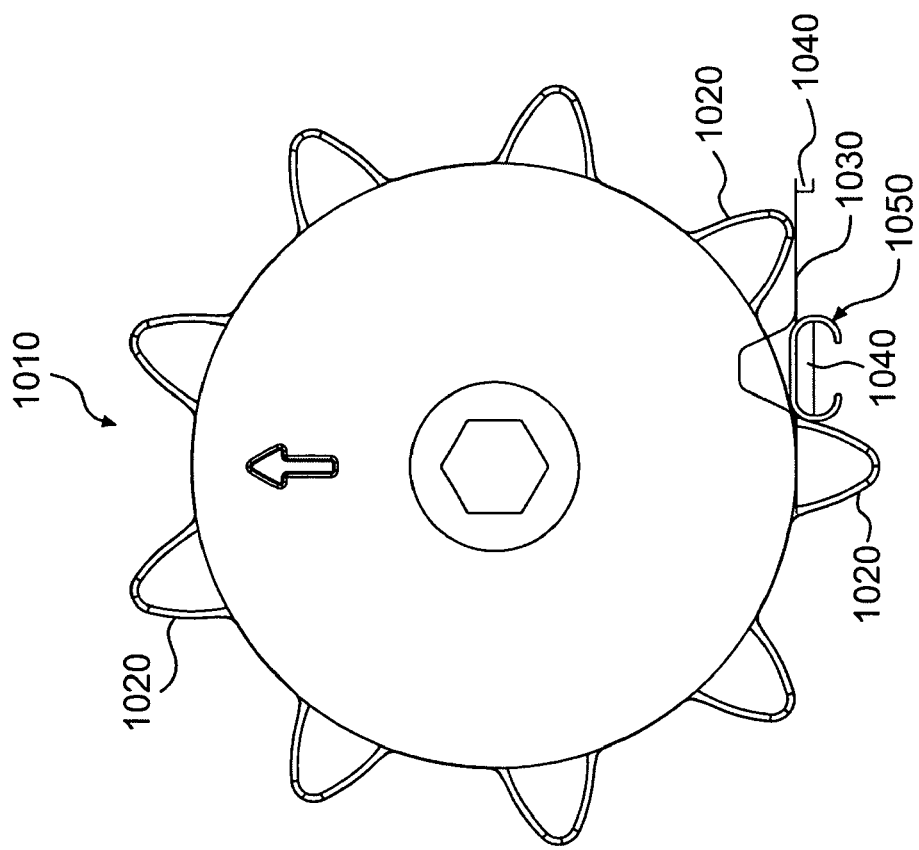
FIGS. 9 and 10 are side views of one conventional drive sprocket and track.
Figure 9:
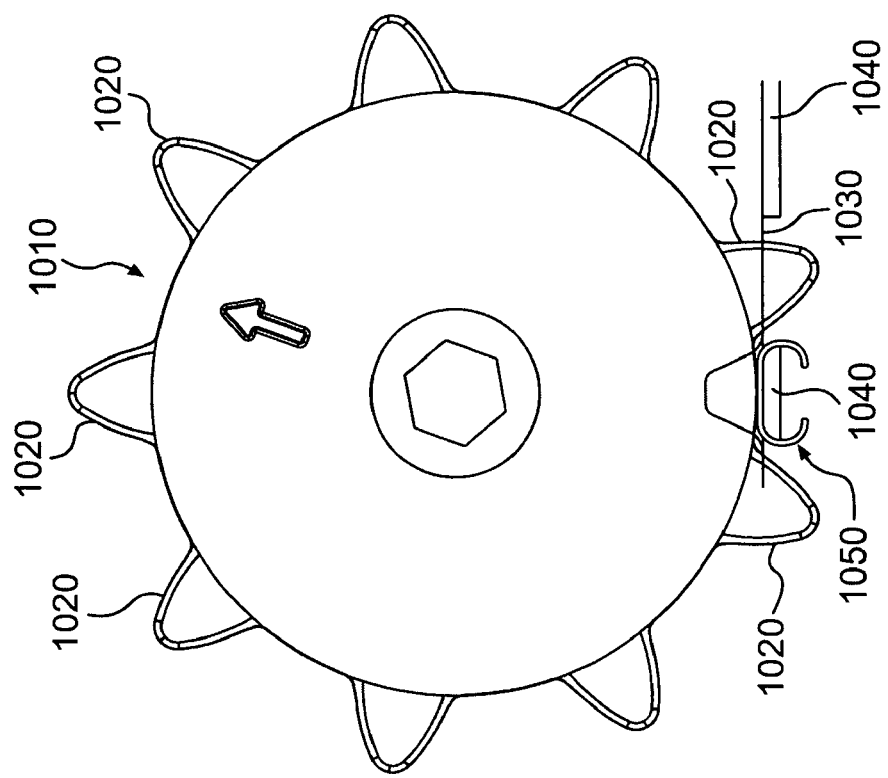

The sprocket 80 is designed to be used with a conventional track like the track 1030 illustrated in FIGS. 9 and 10. The track 1030 includes all of the functional components of the endless track 30. However, if, as is discussed above, one of the track components is modified to achieve one of the objectives of the present invention, a specifically designed track would replace the conventional track 1030.

Furthermore, while in the illustrated embodiment, the sprocket teeth 100 selectively engage the track teeth 130 only during high loads, such selective engagement is not required to practice the present invention. For example, the sprocket and track teeth 90, 100, 110, 120, 130, 140 may be positioned and sized such that all three sets of sprocket teeth 90, 100, 110 simultaneously, continuously engage all three sets of track teeth 120, 130, 140, respectively, to continuously provide increased traction between the sprocket 80 and the endless track 30.

Figure 11:
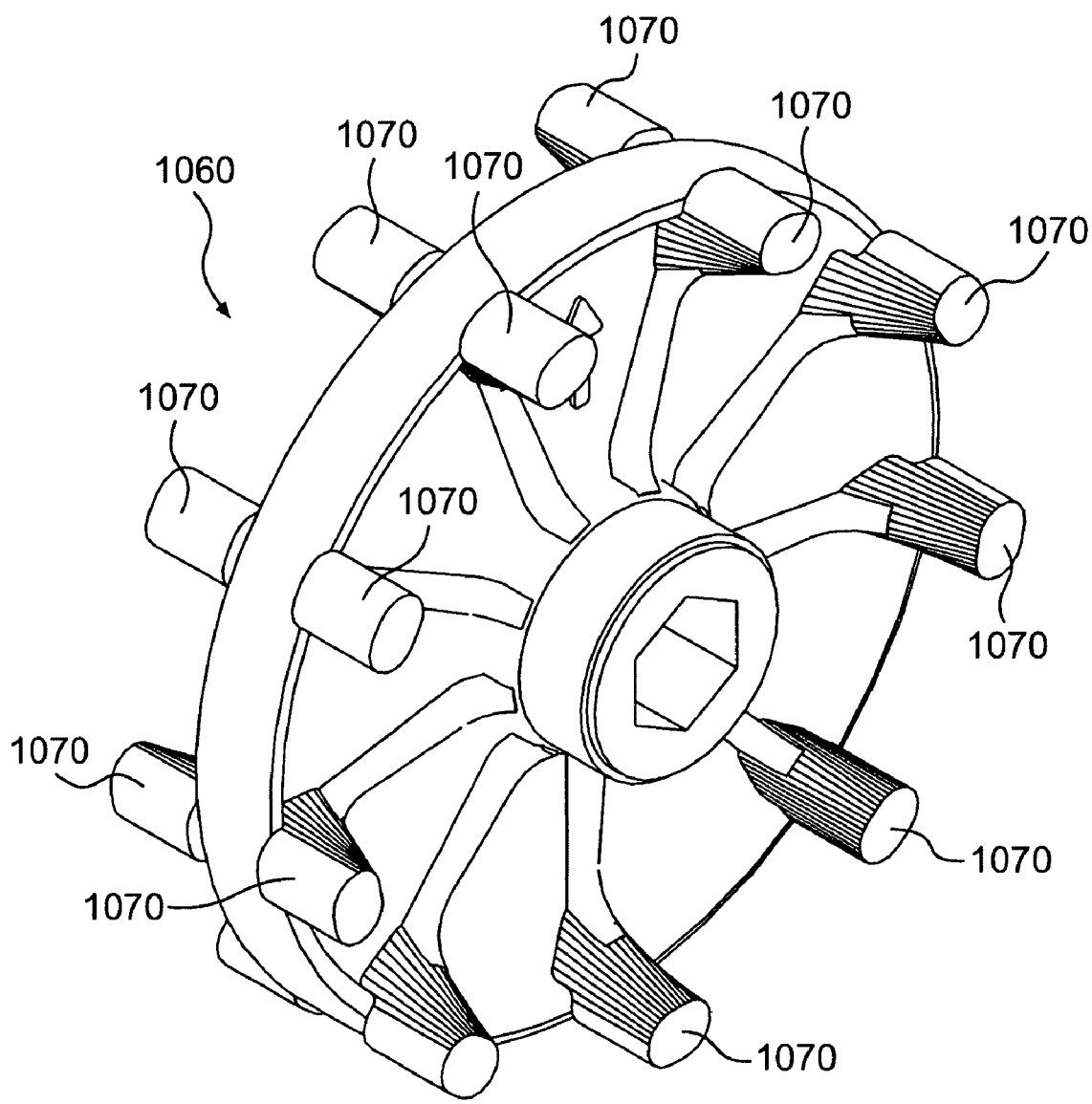
FIG. 11 is a perspective view of a second conventional drive sprocket.
Figure 12:
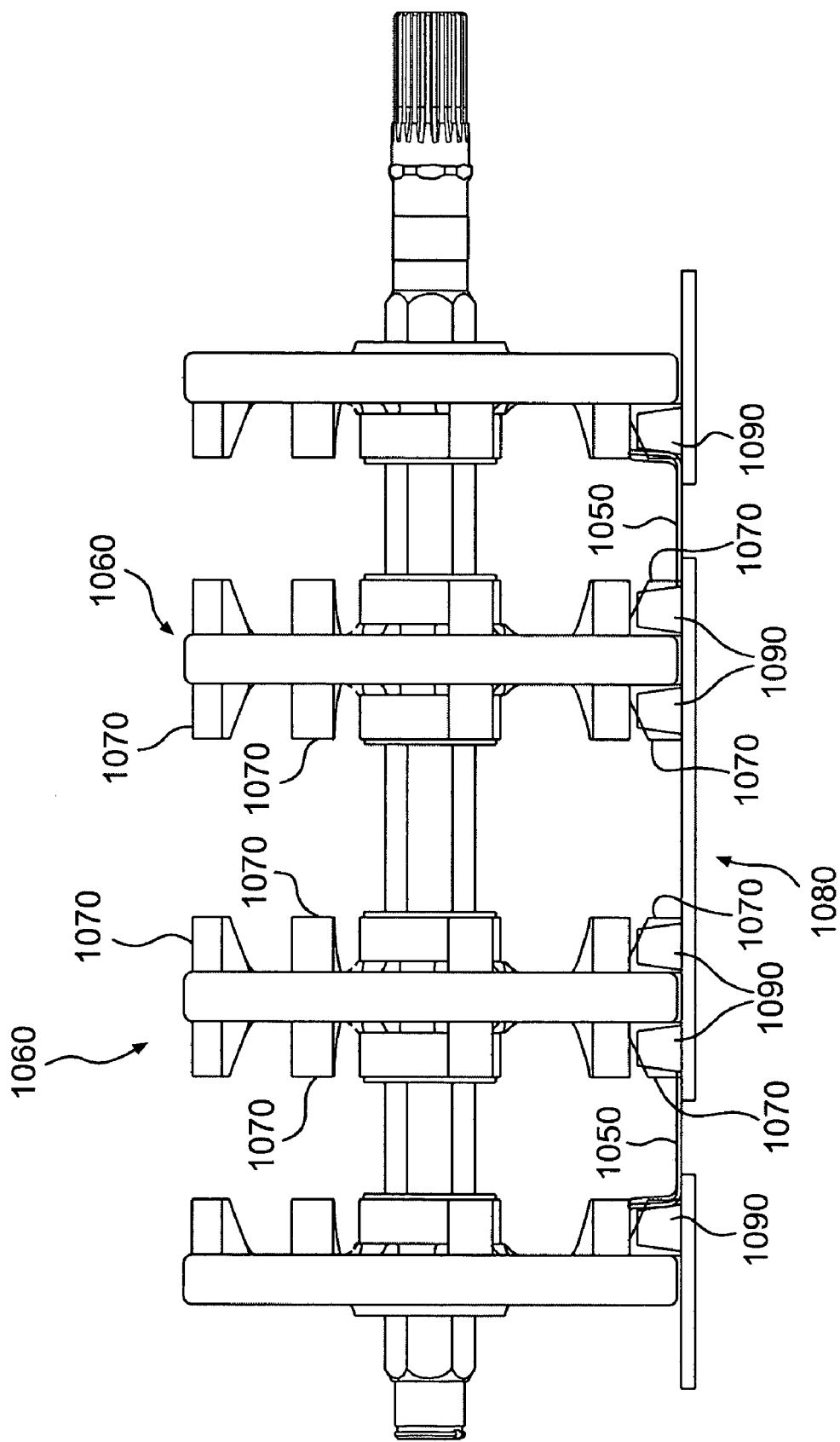
FIG. 12 is a front view of a plurality of conventional drive sprockets, like the sprocket illustrated in FIG. 11, incorporated into the propulsion system of a snowmobile.
Figure 13:
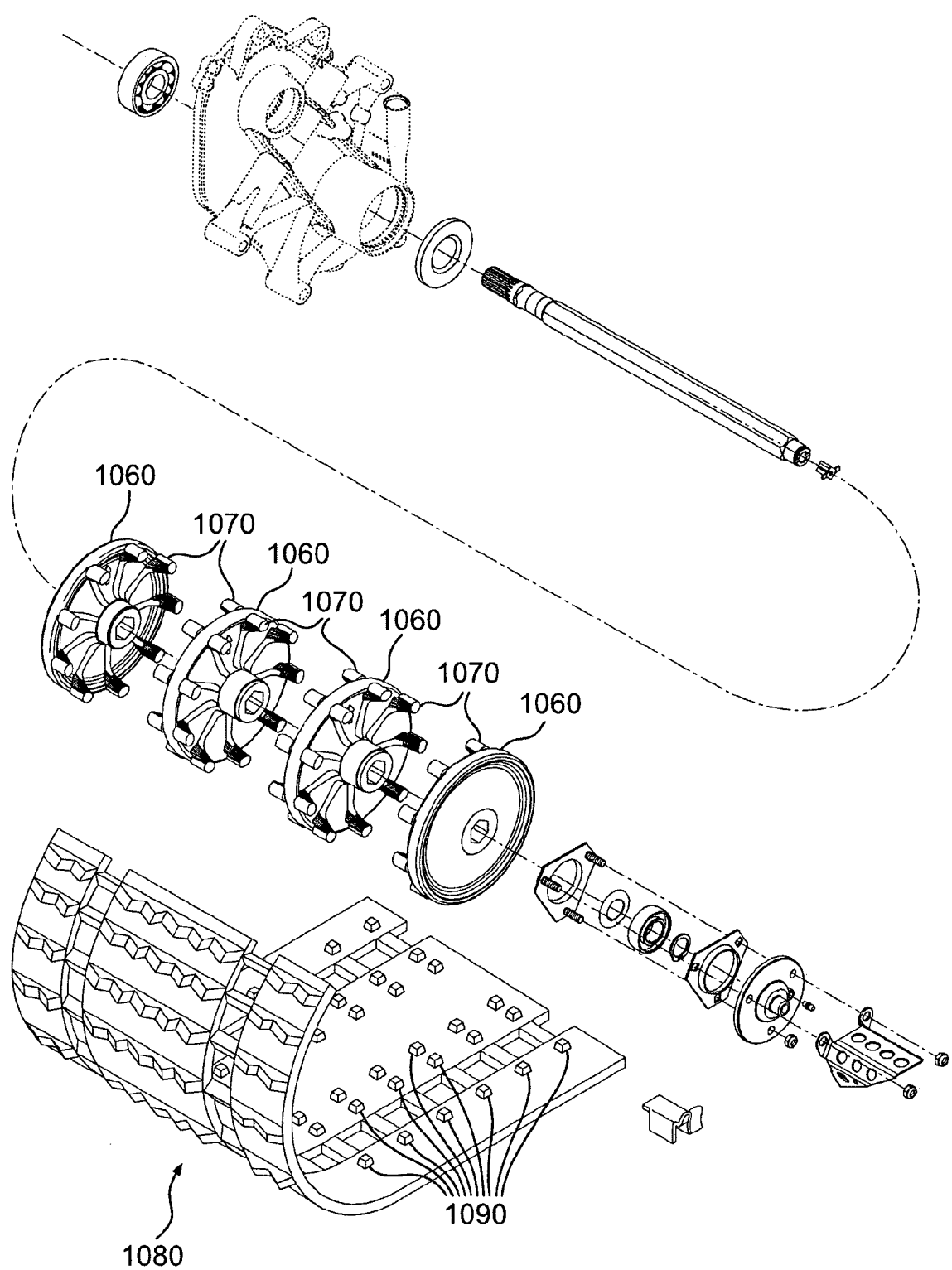
FIG. 13 is a partial exploded view of the propulsion system illustrated in FIG. 12.
Figure 14:
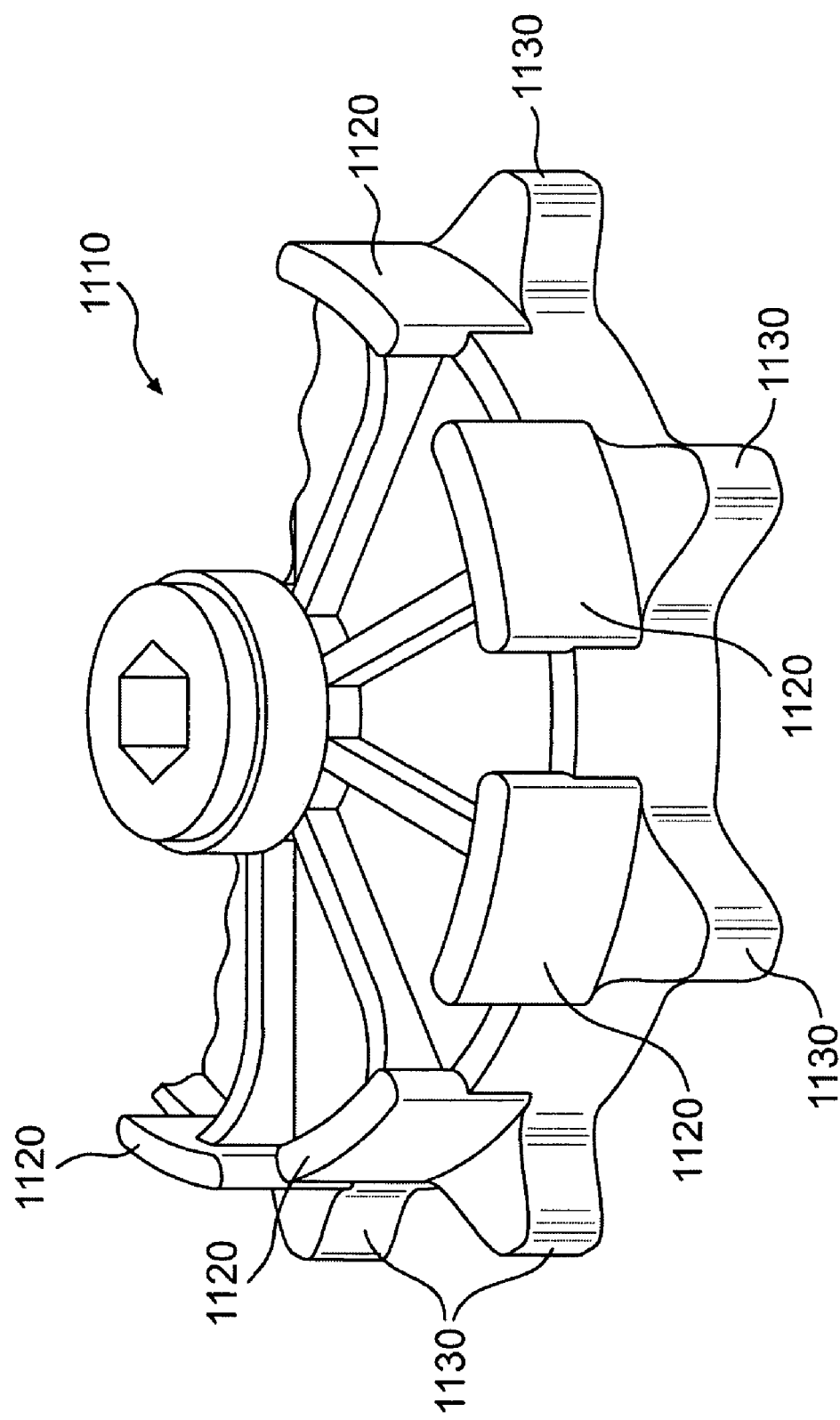
FIG. 14 is a partial perspective view of another conventional drive sprocket.
Figure 15:
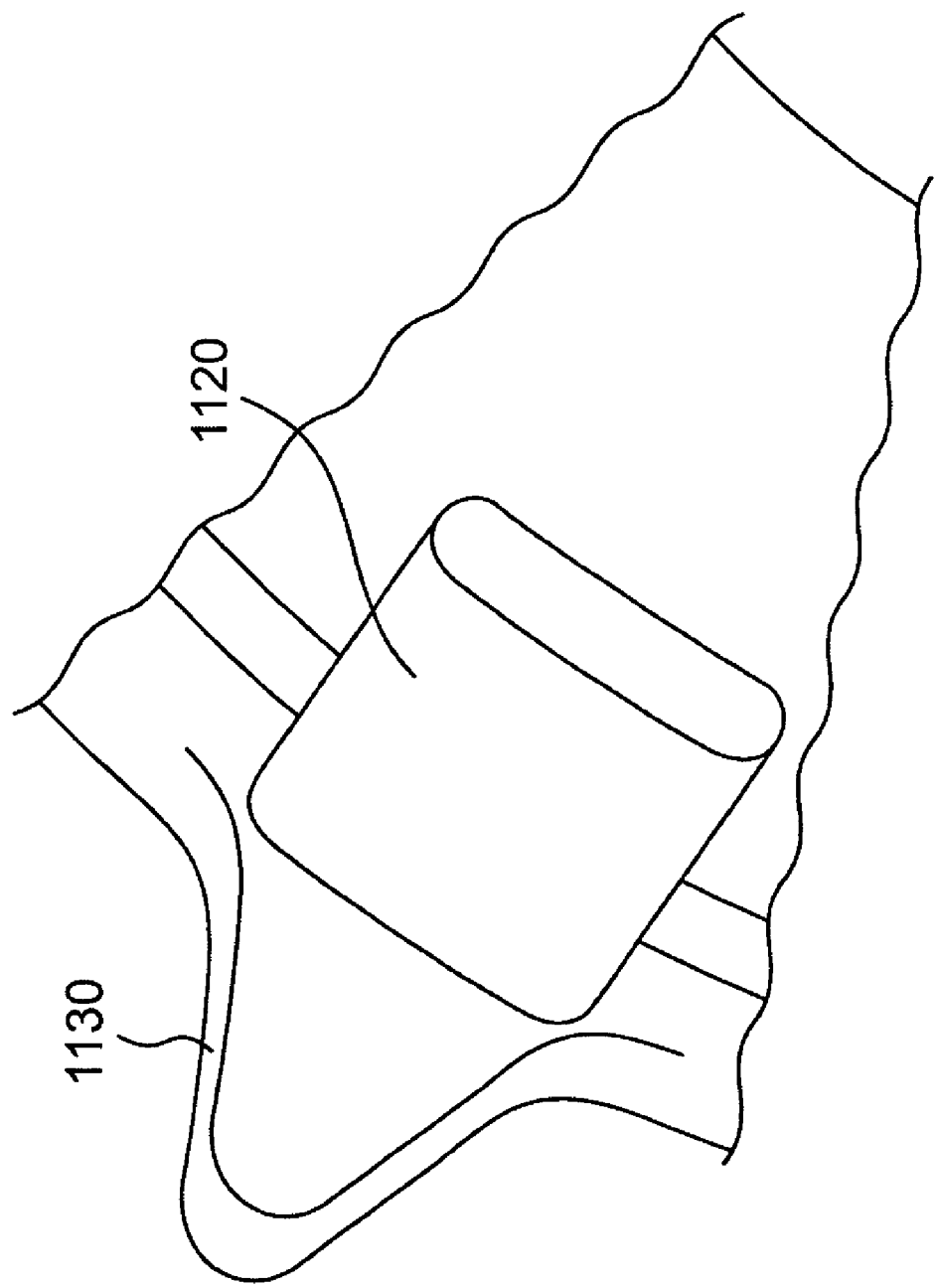
FIG. 15 is an enlarged perspective view of the sprocket teeth of the drive sprocket of FIG. 14.
Figure 16:
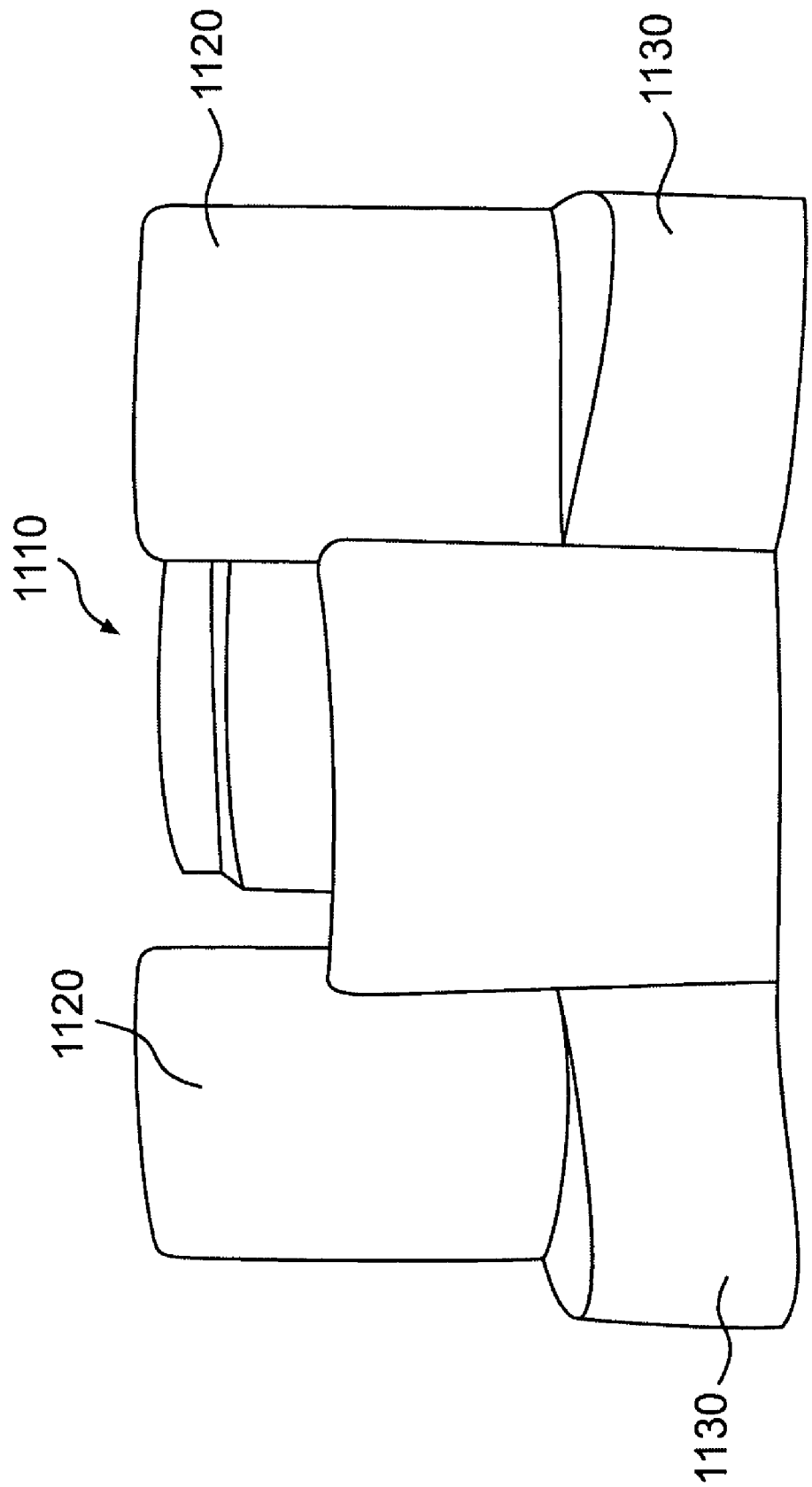
FIG. 16 is a partial top view of the circumferential edge of the drive sprocket of FIG. 14 illustrating the axially-extending sprocket teeth and the radially-extending sprocket teeth.

As illustrated in FIG. 3, because the sprocket and track teeth 90, 100, 110, 120, 130, 140 provide substantial traction between each sprocket 80 and the endless track 30, only two sprockets 80 are required. This reduces the weight of the moving parts of the snowmobile 10 as compared to conventional four sprocket arrangements (see, e.g., FIG. 12). While two sprockets 80 are used in the illustrated embodiment, greater or fewer sprockets 80 may alternatively be used. The precise number of sprockets 80 that should be used to drive an endless track will be dictated by the tractional requirements of the specific tracked vehicle. Furthermore, a sprocket 80 may be used in conjunction with one or more conventional sprockets such as the previously described sprockets 1010, 1060 (see FIGS. 9, 10 and 11).

Figure 7:
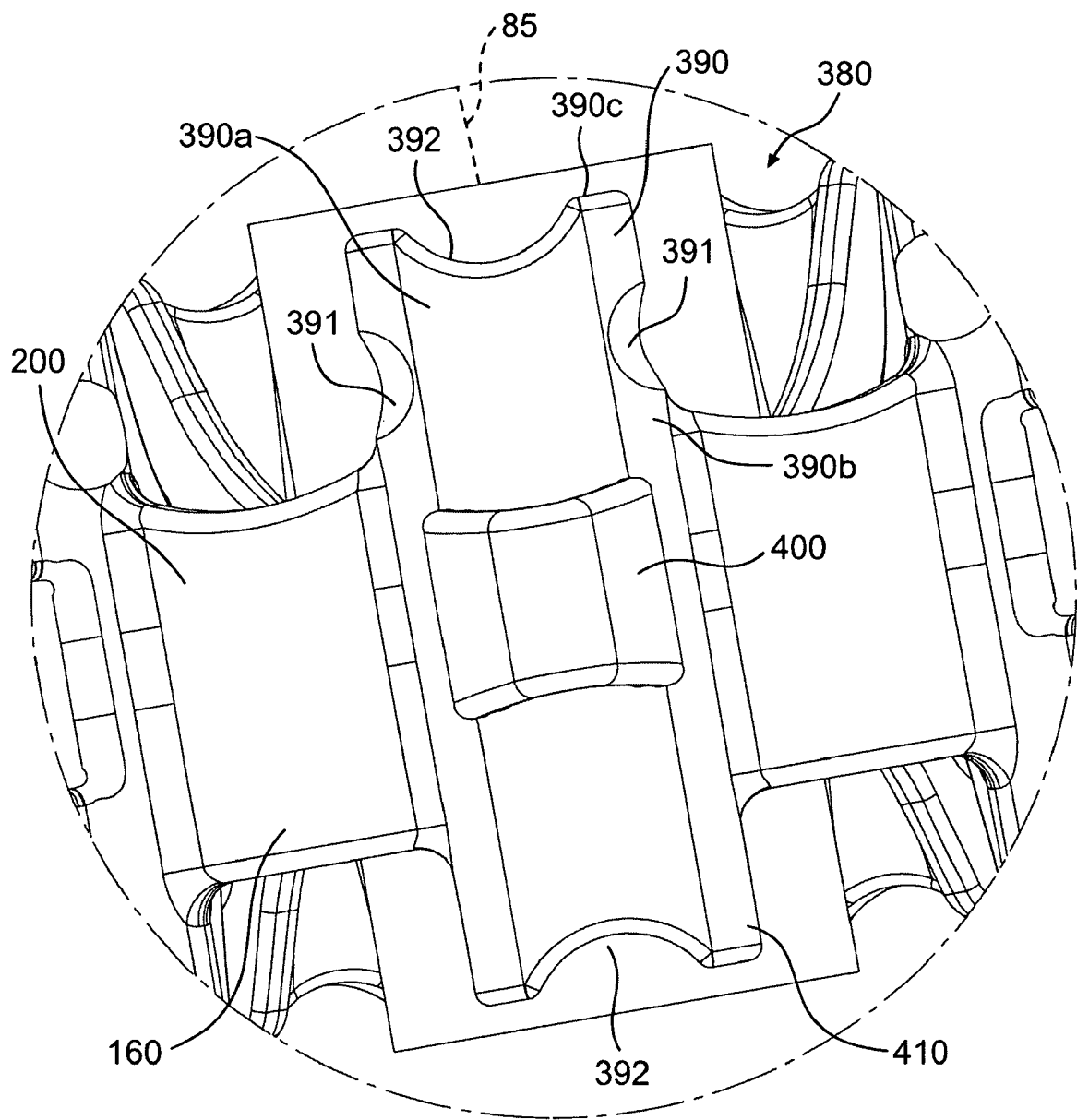
FIG. 7 is a partial top view of the circumferential edge of the drive sprocket according to another embodiment of the present invention.
Figure 8:
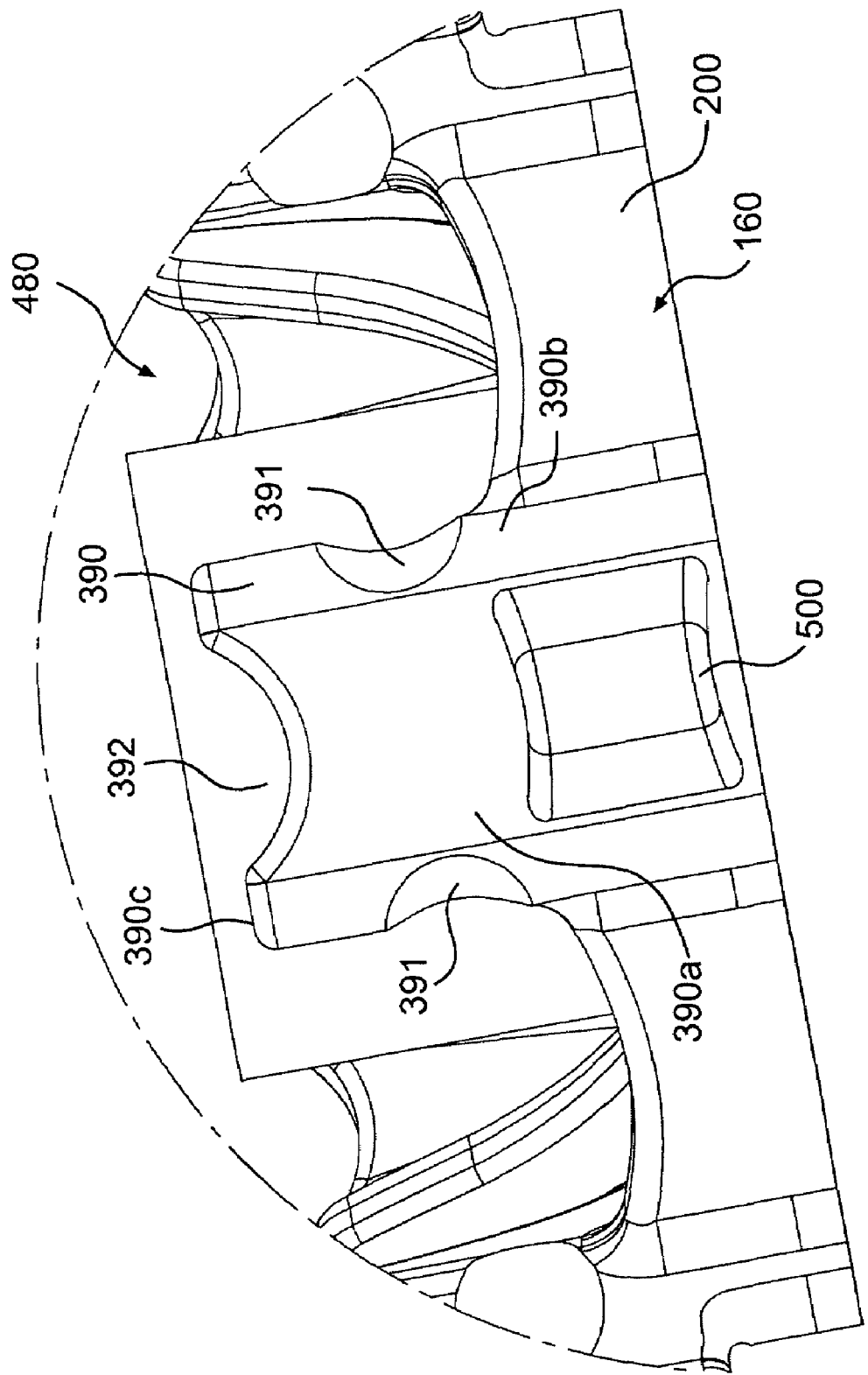
FIG. 8 is a partial top view of the circumferential edge of the drive sprocket according to yet another embodiment of the present invention.

Variations of the drive sprocket 80 are illustrated in FIGS. 7 and 8. Like the sprocket 80, each sprocket 380 shown in FIG. 7 includes three sets of sprocket teeth 390, 400, 410 that engage three corresponding sets of track teeth 120, 130, 140 in the endless track 30 to provide traction between the sprockets 80 and the endless track 30. The sprocket 380 has a similar construction to the drive sprocket 80. For the sake of brevity, the common components including the endless track 30 will not be described in further detail. Reference is made to the description above.

The sprocket teeth 400 comprise circumferentially-spaced teeth that project radially outwardly from the perimetrical surface 160. The sprocket teeth 390, 410 comprise circumferentially-spaced teeth that project axially outwardly from the axial surfaces 170, 180, respectively. The sprocket teeth 390 and 410 are substantially mirror images. The drive sprocket 480 is illustrated in FIG. 8, the sprocket 480 differs from sprocket 380 in that one set of the axially-extending teeth is missing.

Like the sprocket teeth 90, 100 and 110, the sprocket teeth 390, 400, 410 are preferably radially aligned such that each sprocket tooth 390 is disposed at the same circumferential position as a corresponding one of each of the sets of sprocket teeth 400, 410, as shown in FIG. 7. In the embodiment of FIG. 8, the sprocket teeth 390 are disposed at the same circumferential position as the sprocket teeth 500.

The perimetrical surface 160 defines sprocket valleys 200 between adjacent sprocket teeth 400 or 500. Like the sprocket teeth 90, each of the sprocket teeth 390 has radially outward surfaces 390a that extend radially outwardly farther from the rotational axis 85 than the adjacent sprocket valleys 200. Each sprocket tooth 390 includes a base portion 390c connecting the sprocket wheel 150 to the tip portion 390b. Notches 391 are formed on opposite circumferential sides of the base portion 390c of each sprocket tooth 390. The notches 391 delimit the transition point between the base portion 390c and the tip portion 390b. Each tip portion 390b includes a notch 392 formed therein. The notches 392 provide a valuable reduction in weight without sacrificing performance.

The sprocket teeth 400 in FIG. 7 and sprocket teeth 500 in FIG. 8 have similar construction. The size of the teeth 500 are narrower when compared to the width of the teeth 400 due to the reduced thickness of the sprocket 480. In the embodiments illustrated in FIGS. 7 and 8, the teeth 400 and teeth 500 have a width that is narrower than the teeth 390 and/or teeth 410. With such an arrangement, the teeth 400 and the teeth 500 can be formed on top of the sprocket teeth 390 and 410 rather than on the circumferential side of the sprocket like the prior art. With such a construction, the perimetrical surface 160 of the sprockets 380 and 480 does not contact the endless track 30, which further reduces the generation of noise. The sprockets 380 and 480 engage the endless track 30 in the same manner as described above in connection with sprocket 80. As shown in FIGS. 7 and 8, the sides of the teeth 500 may have a concave curvature, which further reduces the weight of the sprocket.

While the present invention has been described and illustrated as being embodied in a snowmobile 10, the present invention is not limited to snowmobiles. Rather, the present invention is considered applicable to the propulsion of endless tracks used on all types of tracked vehicles, including snow groomers, plows and muskeets.

Furthermore, Additional teeth may be provided on the sprocket 80, 380, 480 and/or the endless track 30 that do not correspond to any of the sprocket or track teeth 90, 100, 110, 120, 130, 140. In other words, not every tooth on the sprocket 80 and track 30 needs to be one of the teeth 90, 100, 110, 120, 130, 140.

The foregoing illustrated embodiments are provided to illustrate the structural and functional principles of the present invention and are not intended to be limiting. To the contrary, the principles of the present invention are intended to encompass any and all changes, alterations and/or substitutions within the spirit and scope of the following claims.

What is claimed is:

1. A sprocket for a vehicle having an endless track and a power plant, the sprocket comprising:
   a sprocket wheel operatively interconnected with the power plant of the vehicle, the sprocket wheel having a rotational axis, a perimetrical surface, and first and second axial surfaces;
   a first plurality of teeth extending radially outwardly from the perimetrical surface in spaced-apart relation;
   a second plurality of teeth extending axially outwardly from the first axial surface in spaced-apart relation; and
   a third plurality of teeth extending axially outwardly from the second axial surface in spaced-apart relation,
   wherein, in a circumferential direction, each of the second plurality of teeth are wider than each of the first plurality of teeth.

2. The sprocket according to claim 1, wherein each of the second plurality of teeth define an outward surface disposed radially farther from the rotational axis than the perimetrical surface.

3. The sprocket according to claim 1, wherein each of the second plurality of teeth defines two notches therein.

4. The sprocket according to claim 3, wherein each of the second plurality of teeth has a base portion and a tip portion, and the notches are formed in the base portion.

5. The sprocket according to claim 1, wherein each of the second plurality of teeth has base portion and a tip portion, where the tip portion has a notch formed therein.

6. The sprocket according to claim 5, wherein each of the third plurality of teeth has base portion and a tip portion, where the tip portion has a notch formed therein.

7. The sprocket according to claim 1, wherein each of the first plurality of teeth is formed on a corresponding outer surface of one of the second plurality of teeth.

8. The sprocket according to claim 1, wherein, in a circumferential direction, each of the third plurality of teeth are wider than each of the first plurality of teeth.

9. The sprocket according to claim 8, wherein each of the first plurality of teeth is formed on a corresponding outer surface of at least a portion of one of the second plurality of teeth and the third plurality of teeth.

10. A sprocket for a vehicle having an endless track and a power plant, the sprocket comprising:
   a sprocket wheel operatively interconnected with the power plant of the vehicle, the sprocket wheel having a rotational axis, a perimetrical surface, and first and second axial surfaces;
   a first plurality of teeth extending radially outwardly from the perimetrical surface in spaced-apart relation; and
   a second plurality of teeth extending axially outwardly from the first axial surface in spaced-apart relation,
   wherein, in a circumferential direction, each of the second plurality of teeth are wider than each of the first plurality of teeth.

11. The sprocket according to claim 10, wherein each of the second plurality of teeth has at least one notch formed therein.

12. The sprocket according to claim 11, wherein each of the second plurality of teeth has a base portion and a tip portion, wherein a pair of notches are formed on opposing sides of the base portion.

13. The sprocket according to claim 11, wherein each of the second plurality of teeth has a base portion and a tip portion, wherein a notch is formed on the tip portion.

14. The sprocket according to claim 10, wherein, each tooth of the first plurality of teeth is formed on an outer surface of a corresponding tooth of the second plurality of teeth.

15. A vehicle comprising:
   a frame;
   a power plant supported by the frame;
   a sprocket operatively connected to the power plant, the sprocket comprising:
      a sprocket wheel rotationally supported by the frame and operatively connected to the power plant, the sprocket wheel having a rotational axis, a perimetrical surface, and first and second axial surfaces,
      a first plurality of sprocket teeth extending radially outwardly from the perimetrical surface in spaced-apart relation,
      a second plurality of sprocket teeth extending axially outwardly from the first axial surface in spaced-apart relation, and
      wherein, in a circumferential direction, each of the second plurality of teeth are wider than each of the first plurality of teeth; and
   an endless track supported by the frame, the endless track passing around and engaging the sprocket.

16. The vehicle according to claim 15, wherein the endless track comprises:
   a belt having an outer side and an inner side, the belt defining a plurality of holes therethrough, the portions of the belt therebetween being a first plurality of track teeth;
   a plurality of lugs projecting from the outer side: and
   a second plurality of track teeth projecting from the inner side, the second plurality of track teeth engaging the second plurality of sprocket teeth.

17. The vehicle according to claim 16, wherein each of the first plurality of track teeth longitudinally registers with each of the second plurality of track teeth, and each of the first plurality of sprocket teeth are axially aligned with each of the second plurality of sprocket teeth.

18. The vehicle according to claim 16, wherein the sprocket further comprises a third plurality of sprocket teeth extending axially outwardly from the second axial surface in spaced-apart relation, and the endless track further comprises a third plurality of track teeth projecting from the inner side, the third plurality of track teeth engaging the third plurality of sprocket teeth.

19. The vehicle according to claim 18, wherein each of the second and third pluralities of track teeth are disposed laterally adjacent to each of the first plurality of teem, on opposite sides thereof.

20. The vehicle according to claim 19, wherein each of the first plurality of sprocket teeth, each of the second plurality of sprocket teeth, and each of third plurality of sprocket teeth are axially aligned.

21. The vehicle according to claim 16, wherein, when the endless track does not deform, the first plurality of track teeth do not engage the perimetrical surface.

22. The vehicle according to claim 21, wherein, when the endless track does not deform, the first plurality of track teeth do not engage the first plurality of sprocket teeth.

23. The vehicle according to claim 21, wherein the second plurality of track teeth comprise a flexible, resilient material, and
   wherein, when the second plurality of track teeth deform under a load exerted thereon by the second plurality of sprocket teeth, the first plurality of sprocket teeth engage the first plurality of track teeth to supplement traction between the sprocket and the endless track.

24. The vehicle according to claim 23, wherein:
   the endless track further comprises a plurality of cleats, each cleat including a base portion secured to one of the first plurality of track teeth and at least one cleat portion projecting from the base portion away from the inner side,
   when the second plurality of track teeth do not deform, the base portions of the cleats do not contact the perimetrical surface; and
   when the second plurality of track teeth deform under a load exerted thereon by the second plurality of sprocket teeth, the first plurality of sprocket teeth engage the cleats to enhance traction between the sprocket and the endless track.

25. The vehicle according to claim 16, wherein the perimetrical surface defines a sprocket valley between adjacent teeth of the first plurality of sprocket teeth, the inner side of the belt defines a track valley between adjacent teeth of the second plurality of track teeth, each of the second plurality of sprocket teeth defines an outward surface, and the outward surfaces of the second plurality of sprocket teeth engage the track valleys as the sprocket rotates such that when the endless track does not deform, the first plurality of track teeth do not contact the sprocket valleys.

26. The vehicle according to claim 25, wherein the outward surfaces of the second plurality of sprocket teeth are disposed radially further from the rotational axis than the sprocket valleys.

27. The vehicle according to claim 25, wherein the endless track further comprises a plurality of alignment cleats, each cleat including a base portion secured to one of the first plurality of track teeth and at least one cleat portion projecting from the base portion away from the inner side, and wherein, when the endless track does not deform, the base portions of the cleats do not contact the sprocket valleys.

28. The vehicle according to claim 16, wherein the endless track comprises a resilient, flexible material, and wherein the first and second pluralities of track and sprocket teeth are sized and spaced such that the first plurality of sprocket teeth drivingly engage the first plurality of track teeth only when a portion of the endless track deforms longitudinally as the second plurality of sprocket teeth apply pressure to the second plurality of track teeth.

29. The vehicle according to claim 16, wherein the endless track further comprises a plurality of cleats, each cleat including a base portion secured to one of the first plurality of track teeth and a cleat portion projecting from the base portion away from the inner side, and wherein, when the endless track is laterally aligned with the sprocket, the cleat portions do not touch the sprocket as the sprocket rotates.

30. The vehicle according to claim 16, wherein:

the endless track further comprises a plurality of cleats, each cleat including a base portion secured to one of the first plurality of track teeth and a cleat portion projecting from the base portion away from the inner side, each of the second plurality of sprocket teeth defines two notches, and as the sprocket rotates, the cleat portions extend into the notches of adjacent ones of the second plurality of sprocket teeth.

31. The vehicle according to claim 30, wherein each of the second plurality of sprocket teeth has a base portion and a tip portion, and the notches are formed in the base portion of the second plurality of sprocket teeth.

32. The vehicle according to claim 16, wherein the first plurality of track teeth engage the first plurality of sprocket teeth as the sprocket rotates.

33. The vehicle according to claim 18, wherein each of at least one of the second plurality of teeth and the third plurality of teeth has at least one notch formed therein.

34. The vehicle according to claim 33, wherein each of the second plurality of teeth and the third plurality of teeth has a base portion and a tip portion, wherein a pair of notches are formed on opposing sides of the base portion.

35. The vehicle according to claim 33, wherein each of the second plurality of teeth and the third plurality of teeth has a base portion and a tip portion, wherein a notch is formed on the tip portion of at least one of the second plurality of teeth and the third plurality of teeth.

36. The vehicle according to claim 15, wherein, in a circumferential direction, each of the second plurality of teeth and the third plurality of teeth are wider than each of the first plurality of teeth.

* * * * *